/ 6544

358-74 OR 3,637,923 SR

United States Patent

Poppy

[15] 3,637,923

[45] Jan. 25, 1972

[54] AUTOMATIC BRIGHTNESS LIMITER

[72] Inventor: Dwight J. Poppy, Arlington Heights, Ill.

[73] Assignee: Zenith Radio Corporation, Chicago, Ill.

[22] Filed: Oct. 30, 1970

[21] Appl. No.: 85,354

[52] U.S. Cl. ....178/5.4 R
[51] Int. Cl. ....H04n 9/12
[58] Field of Search....178/5.4, 5.4 AC

[56] References Cited

UNITED STATES PATENTS

| | | | |
|---|---|---|---|
| 3,109,891 | 11/1963 | Molzahn | 178/5.4 R |
| 3,267,210 | 8/1966 | Townsend | 178/5.4 AC |
| 3,465,095 | 9/1969 | Hansen et al | 178/5.4 R |
| 3,578,903 | 5/1971 | Willis | 178/5.4 R |

*Primary Examiner*—Richard Murray
*Attorney*—John J. Pederson and Donald B. Southard

[57] ABSTRACT

An automatic brightness limiter circuit in a color television receiver for limiting the average beam current in an image reproducer due to color programming requiring high-beam current levels and/or high-background brightness signals. The limiter circuitry utilizes the total composite video signal developed by the output stage of the luminance processing channel in conjunction with the video matrix network to activate a feedback network whenever the total composite video signals exceed a predetermined safety level. Control signals generated by the feedback network at its output terminal are coupled to a luminance driver amplifier to vary the quiescent bias potential thereof and consequently reduce the amplitude of the luminance signals applied to the image reproducer. The limiter circuitry further includes an integrating network for averaging the control signals to provide a substantially steady-state potential representative of the average beam current developed by the image reproducer during the previous scanning field.

6 Claims, 2 Drawing Figures

Inventor
Dwight J. Poppy
By [signature]
Attorney

Inventor
Dwight J. Poppy
By [signature]
Attorney

AUTOMATIC BRIGHTNESS LIMITER

BACKGROUND OF THE INVENTION

The present invention relates generally to improvements in color television receivers and more particularly to automatic brightness limiter circuitry for limiting the average beam current in the image reproducer so as to prevent damage thereto upon reception of adverse color programming or abnormally high-background brightness content in the reproduced image.

In color television receivers, the image reproducer generates instantaneous beam currents in response to the amplitude of alternating current (AC) components comprising the luminance and chrominance information applied to one of its informational input electrodes. Typical image transmissions generally effect beam currents within safe operational limits for the receiver. If, however, the current levels therein exceed design limits for any extended periods of time, the power dissipation capabilities of the image reproducer may be surpassed. Moreover, the high-voltage power supply during instances of prolonged high-beam current may be incapable of delivering the required beam current. Such overloading reduces the power supply output voltage and results in undesirable raster "blooming." That is, there will be a loss of brightness, reduction of horizontal width and severe defocusing of the reproduced image. It is of course advisable to prevent such adverse operating conditions.

Accordingly, it is desirable to monitor and, under sever signal conditions, limit beam current. Prior art brightness limiters have resorted to measuring parameters external to the image reproducer, but representative of the instantaneous beam current, in order to actuate brightness limiting at appropriate design levels. It follows, therefore, that extremely close correlation between the sampled parameter and the actual instantaneous beam current is desirable.

One useful technique favored in the prior art has been to monitor the luminance signal at one stage in the luminance channel and control the gain of a preceding luminance stage by means of a feedback network in AGC fashion. While the monitoring of luminance signal levels is reliable for black and white programming, it does, under certain conditions, fail to approximate the actual instantaneous beam current during color programming. For example, equal levels of red, green and blue beam current impinging on their respective phosphors generate a solid white raster. The corresponding level of luminance signal associated with the solid white raster is typically sufficient to activate such prior art brightness limiters since the luminance signal is at its maximum amplitude. However, during color programming each color is developed by illuminating certain of the basic red, green and blue phosphors in combination. Moreover, associated with each color is a unique luminance signal level. Thus, yellow which results from equal red and green beam current levels in the absence of any blue beam current has a luminance signal level which is 0.81 that of white. In this instance, a solid yellow raster may induce brightness limiting. Magenta, however, also requires the same amount of beam current (red and blue) as yellow, but its corresponding luminance signal is only 0.41 that of white. Therefore, the prior art brightness limiter may not be activated for a magenta signal whereas it would be activated for a solid yellow raster which requires an identical amount of beam current. Accordingly, it will be understood that the total beam current required to reproduce the various colors during typical color programming has little correlation with the corresponding luminance (Y) levels except for black and white. On color signals, therefore, it may be desirable to limit when the luminance signal is not of a sufficient level to activate the limiter.

As a result, if the average beam current remains at such increased levels over an extended period of time, the power dissipation capabilities of the tube may be exceeded with the expected consequences. At the same time it is to be realized that the image reproducer can in fact tolerate instantaneous beam currents resulting from white picture highlights which exceed design limits for brief periods of time without any deleterious effects. An additional factor to be considered in the design of any circuitry for mass-produced color television receivers is the cost of its incorporation therein. A minimum of additional components is always a design objective while obtaining the desired operational goal.

Accordingly, it is an object of the present invention to provide new and improved circuitry for limiting the beam current level in a television receiver which overcomes the disadvantages and deficiencies of prior circuits.

A further object of the invention is to provide an improved automatic brightness limiter circuit which effectively limits the level of average beam current representative of the background brightness level and chrominance without limiting instantaneous beam current representative of white highlights.

A more particular object of the invention is to provide an improved brightness limiter circuit which maintains the total composite video signals comprised of matrixed luminance and chrominance signals at or below a predetermined design level.

Another object of the invention is to provide an improved automatic brightness limiter circuit of the foregoing type which requires a minimum of additional components for limiting the average beam current developed in the image reproducer during high-background brightness image transmissions and/or adverse color programming.

SUMMARY OF THE INVENTION

In accordance with the present invention, an automatic brightness limiter circuit is provided for limiting the average beam current developed in an image reproducer which circuit is responsive to such currents representative of both the particular color programming as well as the nominal background brightness signals. The automatic brightness limiter circuit as herein described contemplates a novel feedback network arrangement for developing and applying control signals to a luminance amplifier in response to adverse color programming and/or excessive background brightness levels. The input terminal of the feedback means is coupled to the output stage of the luminance channel which, in conjunction with the video matrixing network, develops total composite video signals comprising both output luminance and chrominance information determinative of the instantaneous beam current developed in the image reproducer. Such video signals are further integrated to derive a substantially steady-state potential representative of the average beam current developed over a complete scanning field. The control potential is applied to a luminance driver amplifier for selective control thereof by lowering its quiescent bias potential when such derived total composite video signals exceed the set, predetermined level indicative of picture tube design limits.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals refer to like elements in the several figures and in which:

DESCRIPTION OF THE PREFERRED EMBODIMENT

Figure 2:
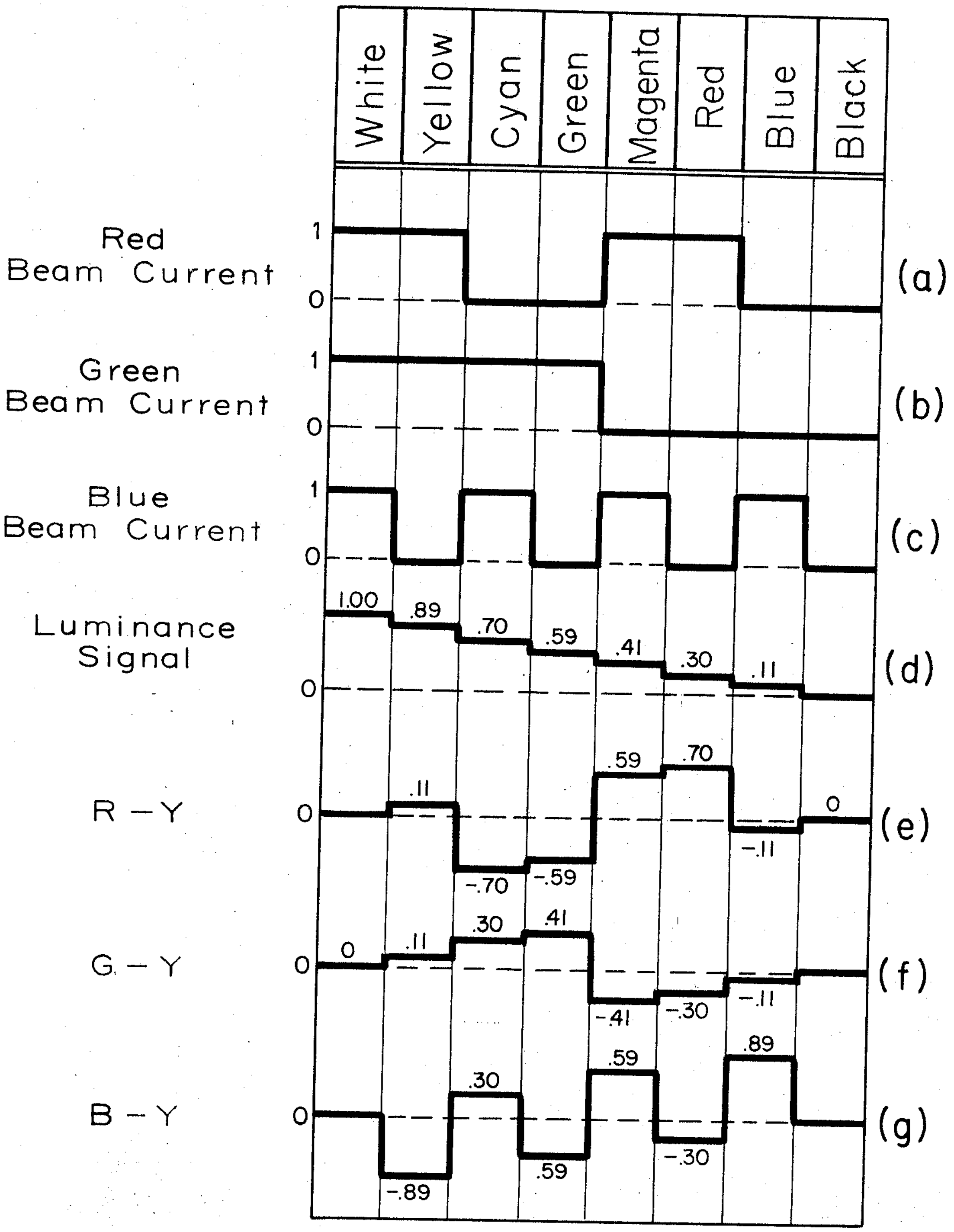
FIG. 2 is a comparative chart useful in understanding prior art brightness limiters and certain operational features of the present invention.

As mentioned previously, the content of the color programming determines to a great extend the actual beam current developed in the image reproducer. This can be best illustrated by reference to FIG. 2. Assuming the red, green and blue phosphors utilized in the image reproducer are of comparable efficiencies, FIGS. 2*a*, 2*b* and 2*c* show the relative levels of red, green and blue beam current required by the image reproducer to generate solid rasters of the several colors listed at the top of FIG. 2. These outputs are realized by matrixing the luminance (Y) signal shown in FIG. 2*d* with the color difference signals (R–Y, G–Y and B–Y) illustrated in FIGS. 2*e*, 2*f* and 2*g*, respectively. It is readily apparent that a totally white raster is generated by equal levels of red, green and blue beam currents, while black results from beam current levels below that required to illuminate the phosphors.

If as in prior art circuits a brightness limiter circuit is utilized which samples only luminance (Y) information, it may be determined, for example, to initiate limiting at 0.75 of unity. Accordingly, it will be seen from FIG. 2*d* that a white raster or a yellow raster would induce the brightness limiting action. It will also be understood from FIGS. 2*a*, 2*b* and 2*c* that the production of yellow requires equal beam current levels of red and green but no blue beam current for a total of two units of beam current. Magenta, on the other hand, is not limited even though it too requires two units of beam current (red and blue) because its luminance (Y) level does not exceed the limiting threshold. Accordingly, it may be desirable to induce brightness limiting on certain color programming when the corresponding luminance levels are below any design limits.

Figure 1:
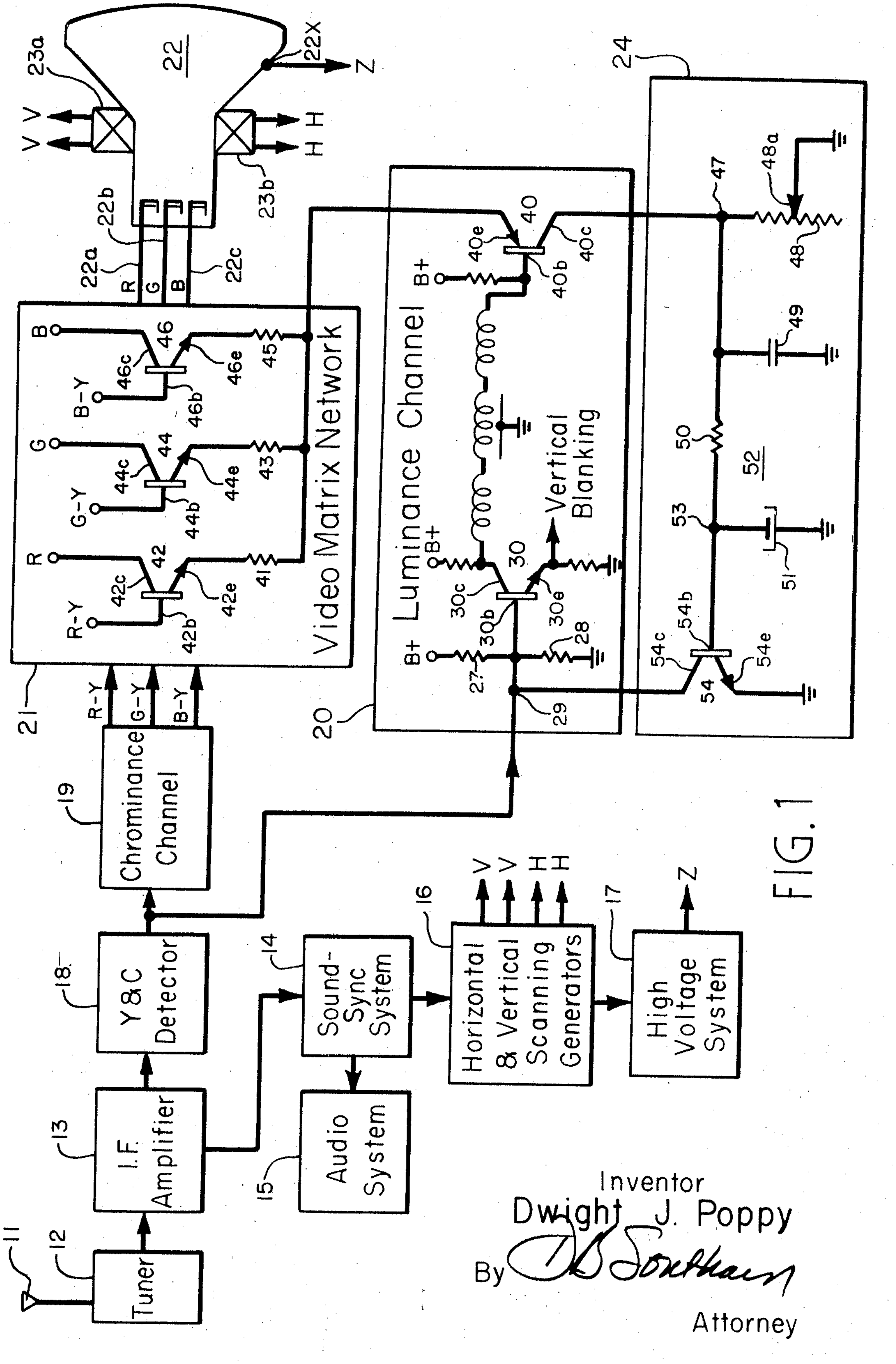
FIG. 1 is a combined schematic and block diagram of a television receiver which includes automatic brightness limiter circuitry in accordance with one embodiment of the invention.

Referring now to FIG. 1, a color television receiver is shown which incorporates automatic brightness limiter circuitry in accordance with the present invention. The receiver includes an antenna 11 coupled to an input tuner stage 12 which amplifies the received signal and converts the same to an intermediate-frequency in the well-known manner. The amplified and converted signal is coupled to intermediate-frequency amplifier 13 where it is further amplified and then coupled to luminance (Y) and chrominance (C) detector 18, and also to a sound-sync system 14. Sound-sync system 14, in turn, connects to an audio system 15 having appropriate circuitry for reproducing the audio portion of the received signal. Sound-sync system 14 further connects to horizontal and vertical scanning generators 16 wherein appropriate scanning signals are developed for application to appropriate deflection yokes 23*a* and 23*b* positioned about the image reproducer 22 to reproduce the televised image in the conventional manner. The horizontal and vertical scanning generators 16 also connect to a high-voltage system 17 wherein a high-voltage accelerating potential is developed for application to the second anode 22*x* of the image reproducer 22.

The Y and C detector 18 is connected to a chrominance channel 19 for developing the chrominance signals R–Y, B–Y and G–Y, which are applied to the video matrix networks 21 as one of the informational inputs thereto. Detector 18 is likewise connected to the luminance channel 20 wherein the direct current (DC) components of the luminance signal, representing black level, are maintained at some predetermined, but substantially fixed level by partial DC coupling. The processed luminance (Y) signals are applied to the video matrix network 21, forming the other of its informational inputs. Appropriate matrixing occurs within matrix network 21 such that signals containing the correct brightness, hue and color saturation information are derived and applied to the appropriate control electrodes of the image reproducer 22 in a manner understood in the art.

The image reproducer 22 may be a conventional shadow mask cathode-ray tube comprising a tricolor image screen or target (not shown) to be selectively scanned by a group of three electron beams developed by individual guns within the tube, the cathodes of which are represented at 22*a*, 22*b* and 22*c*. The three cathodes are connected to the video matrix network 21 from which the various chrominance and luminance information is processed and applied thereto. In the embodiment of the receiver as herein shown, the color signals, R, G and B are applied directly to the cathodes 22*a*, 22*b* and 22*c*, respectively.

As thus far described, the receiver is conventional in general construction and operation such that further and more particular description should not be necessary. More particular consideration, however, may now be given to that portion of the receiver which relates to the preferred embodiment of the present invention, and in general constitutes automatic brightness limiter circuitry in conjunction with the luminance channel and the video matrix network such as identified generally at 20 and 21, respectively.

Operationally, luminance information is coupled to a junction point 29 connected to the base electrode 30*b* of luminance driver transistor 30. Junction 29 serves as the common terminal of a resistive voltage divider network formed by resistors 27, 28 interconnected between a source of unidirectional potential (B+) and ground. Voltage divider network 27, 28 thus provides the quiescent operating bias for transistor 30. The processed output signal of driver transistor 30 is, in turn, coupled to the base electrode 40*b* of luminance output transistor 40.

The output luminance (Y) information developed at the emitter electrode 40*e* of transistor 40 is, in turn, coupled to the emitter electrodes 42*e*, 44*e*, 46*e* in common of video matrixing transistors 42, 44, 46 through their respective emitter resistors 41, 43, 45. Further informational inputs comprised of color difference signals R–Y, B–Y and G–Y developed in the chrominance channel 19 are coupled to the base electrodes 42*b*, 44*b*, 46*b*, respectively. Accordingly, each of the transistors 42, 44 and 46 matrixes its particular input color difference signal with the luminance signal to produce a particularized primary color control signal containing the correct brightness, hue and color saturation. The color control signals identified at R, G and B are developed at the video matrixing transistors' collector electrodes 42*c*, 44*c*, 46*c* and, in turn, are coupled to respective image reproducer cathodes 22*a*, 22*b*, 22*c* for correctly reproducing the transmitted program material.

In addition to its luminance signal processing function, luminance output transistor 40, through collector electrode 40*c* and its associated circuitry, provides a return signal path to a plane of reference potential (ground) for the signals developed in each of the transistors 42, 44, 46. Accordingly, the signal developed at collector 40*c* of transistor 40 is representative of the total composite video signals developed by video matrix network 21.

In accordance with one aspect of the present invention, a feedback network 24 utilizes the total composite video signals available at collector 40*c* of transistor 40 as an informational input representative of the beam current developed in the image reproducer 22. The feedback circuitry is effective to maintain the average beam current at a predetermined design limit during reception of color signal transmissions and/or high-background brightness signals tending to generate high-beam currents. Such limiting action is maintained notwithstanding the luminance information may be at less than its maximum and in fact insufficient to activate prior art brightness limiters.

Generally, the brightness limiter circuit includes a potentiometer 48 connected at one end to the collector 40*c* of transistor 40, forming a junction 47, and having its adjustable tap arm 48*a* coupled to ground so as to effect a means for artificially monitoring the level of total instantaneous beam current. A capacitor 49 is couple between junction 47 and ground to provide a low impedance for high frequencies of the video signals. Additionally, a resistor 50 and a capacitor 51 form an integrating network 52 between junction 47 and ground which develops suitable control signals at a common junction, identified at 53, which control signals are intended for application to later stages of the feedback network 24. In effect, integrating network 52 averages the control signals over a predetermined time interval, in this case a complete scanning field, thereby preventing abrupt control signal fluctuations when a totally black horizontal scan line is followed by an entirely white line.

The derived control signals are applied to the base electrode 54b of a bias control transistor 54. Since the associated emitter electrode 54e is returned directly to ground, transistor 54 will be conductive only when the input control signals at base 54b exceed the base-emitter voltage drop, typically 0.7 volt for a silicon transistor. To ensure that bias control transistor 54 is active only when the average beam current exceeds the design limit, potentiometer 48 is adjusted so the minimum objectionable beam current level, as represented by the total composite video signals at transistor collector 40c, coincides with the turn-on point of transistor 54. Accordingly, it will be appreciated that upon an increase in the signal information applied to the base 54b of transistor 54 due to color programming and/or high-background brightness signals requiring high-beam current levels, transistor 54 will be forced to a higher-conduction level. Conversely, transistor 54 will be required to conduct less or not at all on most color programming and low-background brightness signals due to the smaller control signals applied to its base.

The collector 54c serving as the output of bias control transistor 54 is coupled to the junction 29 of the voltage divider network which provides the quiescent bias for the luminance driver transistor 30. Whenever transistor 54 is conducting heavily as a result of composite video signal representing a current level exceeding the design limits, a proportional current is drawn from the B+ power supply through resister 27. The increased current produces an increased voltage drop across resistor 27 and hence the voltage measured at junction 29 decreases as the signal level increases above the design maximum. Accordingly, in the absence of adverse color programming and/or excessive luminance signals, base 30b is maintained at a relatively constant bias. When transistor 54 is conducting, however, the quiescent bias point of base 30b will be shifted downward so that the output of transistor 30 is at or below the design maximum.

Since the conduction level of transistor 54 is responsive to the total composite video signal at any particular time, transistor 54 selectively controls the quiescent bias of luminance driver transistor 30 thereby, in effect, controlling the level of average beam current. The result is that beam current within the image reproducer 22 is effectively held within desired limits and objectionable picture "blooming" is prevented under certain abnormal signal conditions to assure that the quality of the picture presentation remains at the desired optimum.

The embodiment as disclosed herein is essentially similar to the circuitry of a commercialized version of the invention. Circuit impedance values and other parameters are set forth below. It is to be understood, however, that such are set forth purely by way of illustration and not as limitations thereon.

| | | |
|---|---|---|
| source B+ | volts | 24 |
| resistor 27 | ohms | 12,000 |
| resistor 28 | ohms | 1,000 |
| resistor 41 | ohms | 220 |
| resistor 43 | ohms | 220 |
| resistor 45 | ohms | 220 |
| rheostat 48 | ohms | 100 |
| capacitor 49 | microfarads | 0.05 |
| resistor 50 | ohms | 1,000 |
| capacitor 51 | microfarads | 50 |
| transistor 30 | type | FT 3641 |
| transistor 40 | type | FT 3638 |
| transistor 42 | type | SE 7056 |
| transistor 44 | type | SE 7056 |
| transistor 46 | type | SE 7056 |
| transistor 54 | type | FT 3641 |

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

I claim:

1. In a color television receiver having a matrixing network for developing primary color control signals from luminance and color-difference signal information and applying the same to an image reproducer, an automatic brightness limiter, comprising in combination:
   - a luminance channel having intercoupled driver and output stages, the latter developing, in conjunction with said matrixing network, a composite video signal comprising both luminance and chrominance signal information;
   - signal monitoring means coupled to said luminance output stage for deriving elemental control signals representative of the level of instantaneous composite video signal level and, in turn, the level of beam current within the image reproducer;
   - integrating means coupled to said signal monitoring means for averaging said control signals over a predetermined time interval to form substantially DC components; and
   - bias control means coupled between said integrating means and said driver stage for selectively varying the quiescent operating level thereof in response to averaged control signal excursions exceeding a predetermined limiting level.

2. An automatic brightness limiter in accordance with claim 1 wherein said output stage comprises a semiconductor device having a base electrode coupled to said driver stage, an emitter electrode coupled to said matrixing network and a collector electrode coupled to a plane of reference potential through said signal monitoring means.

3. An automatic brightness limiter in accordance with claim 2 wherein said signal monitoring means includes an adjustable resistance interconnected between said collector electrode of said semiconductor device and said plane of reference potential for controlling the level of composite video signals developed at said collector electrode.

4. An automatic brightness limiter in accordance with claim 1 wherein said integrating means includes a resistor and capacitor serially connected between said output stage collector electrode and said plane of reference potential, and wherein said averaging of said control signals is effected at the junction of said resistor and said capacitor.

5. An automatic brightness limiter in accordance with claim 1 wherein said bias control means comprises a semiconductor device having a base electrode coupled to said averaged control signals, an emitter electrode coupled to said plane of reference potential and a collector electrode coupled to said driver stage.

6. An automatic brightness limiter in accordance with claim 5 wherein said semiconductor device is normally cut off and is driven to conduction when said averaged control signals as applied to said base electrode exceed a predetermined level.

* * * * *